(12) United States Patent
Lim et al.

(10) Patent No.: US 11,141,699 B2
(45) Date of Patent: Oct. 12, 2021

(54) INTEGRAL TYPE IMMERSED HOLLOW FIBER MEMBRANE MODULE EQUIPMENT FOR AIR SCOURING

(71) Applicants: Seojin Energy Co., Ltd., Incheon (KR); Seung Kyun Park, Gyeonggi-do (KR)

(72) Inventors: Tea Hyoung Lim, Seoul (KR); Seung Kyun Park, Gyeonggi-do (KR); Sung Hyo An, Incheon (KR); Hyun Hoon Jung, Gangwon-do (KR); Jae Young Lee, Seoul (KR); Ji Yun Seon, Seoul (KR); Jun Kim, Seoul (KR)

(73) Assignees: SEOJIN ENERGY CO., LTD., Incheon (KR); Seung Kyun Park, Gyeonggi-Do (KR)

( * ) Notice: Subject to any disclaimer, the term of this patent is extended or adjusted under 35 U.S.C. 154(b) by 61 days.

(21) Appl. No.: 16/704,667

(22) Filed: Dec. 5, 2019

(65) Prior Publication Data

US 2020/0179878 A1 Jun. 11, 2020

(30) Foreign Application Priority Data

Dec. 7, 2018 (KR) ........................ 10-2018-0157365

(51) Int. Cl.
*B01D 63/02* (2006.01)
*B01D 65/02* (2006.01)

(52) U.S. Cl.
CPC ............. *B01D 63/02* (2013.01); *B01D 65/02* (2013.01); *B01D 2313/06* (2013.01); *B01D 2313/26* (2013.01); *B01D 2315/06* (2013.01); *B01D 2321/185* (2013.01)

(58) Field of Classification Search
CPC .... B01D 63/02; B01D 65/02; B01D 2313/06; B01D 2313/26; B01D 2315/06; B01D 2321/185; B01D 65/08; B01D 46/543; B01D 61/00; B01D 63/04; C02F 1/44
See application file for complete search history.

(56) References Cited

U.S. PATENT DOCUMENTS 7,087,173 B2 * 8/2006 Cote ...................... B01D 65/08
210/650

FOREIGN PATENT DOCUMENTS

| KR | 20160080010 A | * | 7/2016 | |
| KR | 10-1728584 B1 | | 4/2017 | |
| WO | WO-2012133068 A1 | * | 10/2012 | ............. B01D 65/08 |
| WO | WO-2012148990 A1 | * | 11/2012 | ............. B01D 65/08 |

* cited by examiner

*Primary Examiner* — Waqaas Ali
(74) *Attorney, Agent, or Firm* — The PL Law Group, PLLC

(57) ABSTRACT

An immersed hollow fiber membrane module according to an embodiment of the present disclosure includes a hollow fiber membrane bundle formed by fixing a plurality of hollow fiber membranes by a potting agent, and a module supporting unit provided at one side of the hollow fiber membrane bundle to support the hollow fiber membrane bundle, the module supporting unit having an air cleaning time delaying portion configured to delay or intermittently maintain an air cleaning time for air introduced therein and discharged out.

9 Claims, 9 Drawing Sheets

INTEGRAL TYPE IMMERSED HOLLOW FIBER MEMBRANE MODULE EQUIPMENT FOR AIR SCOURING

CROSS-REFERENCE TO RELATED APPLICATION

This application claims priority from Korean Patent Application No. 10-2018-0157365 filed on Dec. 7, 2018, in the Korean Intellectual Property Office, and all the benefits accruing therefrom under 35 U.S.C. 119, the contents of which in their entirety are herein incorporated by reference.

BACKGROUND

1. Technical Field

This disclosure relates to an immersed hollow fiber membrane module, and more particularly, to an integral type immersed hollow fiber membrane module equipment for air scouring, which may delay or intermittently maintain air cleaning time using an efficient structure for generating coarse bubbles to save energy and improve a filtration flow rate in comparison to the conventional art.

2. Background Art

A hollow fiber membrane module is a filtration treatment device that uses hollow fiber, which is a thin fiber with an empty space in the middle thereof, and a lot of small pores are formed in the surface of the hollow fiber membrane module.

The hollow fiber membrane module is a device that effectively filters a multicomponent liquid mixed with various materials by selectively allowing only a specific material smaller than a pore size thereof to pass therethrough and removing a material larger than the pore size.

The hollow fiber membrane module has been widely used in the field of ultrafiltration and precision filtration such as sterile water and drinking water production. Recently, the hollow fiber membrane module is applied in various ways such as solid-liquid separation for separating sludge and treated water, instead of a conventional sedimentation tank, in a wastewater treatment plant.

The hollow fiber membrane modules used for sewage treatment is classified into an external circulation type and a module immersion type according to the method of applying the hollow fiber membrane to an aeration tank. Recently, the immersion type is mainly used for wastewater treatment.

FIG. 1 is a diagram showing a conventional immersed hollow fiber membrane module.

Referring to FIG. 1, a conventional immersed hollow fiber membrane module includes a module case 30, a hollow fiber membrane bundle (not shown) configured by fixing a plurality of hollow fiber membranes 10 by a first potting agent 20, and adhesive layers 40, 45, 50 for fixing the hollow fiber membrane bundle and the module case 30.

The module case 30 includes a water collecting unit 32 for collecting a permeating water, a discharge hole 34 for discharging the permeating water collected in the water collecting unit 32, and a holding protrusion 36. The hollow fiber membrane bundle is coupled in the form of being placed on the holding protrusions 36 of the module case 30.

Meanwhile, the immersed hollow fiber membrane module as shown in FIG. 1 may be common. In the conventional immersed hollow fiber membrane module, a separate air scouring device is installed to reduce membrane contamination of the hollow fiber membrane, which causes excessive air discharge at locations adjacent to the fiber membrane bundle, thereby deteriorating the efficiency of the filtration process. In this regard, there is a need for technology development for an immersed hollow fiber membrane module equipment, which may ensure membrane contamination reduction efficiency and energy saving required for air scouring, not yet known in the art.

SUMMARY

This disclosure is directed to providing an integral immersed hollow fiber membrane module equipment for air scouring, which may delay or intermittently maintain air cleaning time using an efficient structure for generating coarse bubbles to improve energy saving and filtration treatment efficiency in comparison to the conventional art.

In one general aspect, there is provided an immersed hollow fiber membrane module, comprising: a hollow fiber membrane bundle formed by fixing a plurality of hollow fiber membranes by a potting agent; and a module supporting unit provided at one side of the hollow fiber membrane bundle to support the hollow fiber membrane bundle, the module supporting unit having an air cleaning time delaying portion configured to delay or intermittently maintain an air cleaning time for air introduced therein and discharged out.

The module supporting unit may include: a unit housing forming an appearance thereof; a bundle placing portion provided to an inner wall of the unit housing so that an end of the hollow fiber membrane bundle is placed thereon; a permeating water collecting space formed in the unit housing to communicate with the hollow fiber membrane bundle so that a permeating what is collected therein; and an air flowing space formed in the unit housing to be adjacent to the permeating water collecting space so that air flows therein, wherein the air cleaning time delaying portion may be provided in the air flowing space.

The module supporting unit may further include a barrier provided in the unit housing to compart the permeating water collecting space and the air flowing space, and the air cleaning time delaying portion may be air baffle walls connected to intersect the barrier and spaced apart from each other.

The module supporting unit may further include: an air injection portion connected to the unit housing to supply air to the air flowing space of the unit housing; and a plurality of air outlet holes provided at a sidewall of the unit housing in a region where the air flowing space is located, and the air outlet hole may be formed through the sidewall of the unit housing with a width gradually increasing in an outward direction.

The module supporting unit may further include an air guide connected to the unit housing in the region where the air outlet hole is located and guides the flow of a discharged air so that the air is supplied to the hollow fiber membrane bundle.

The module supporting unit may further include a sludge outlet hole formed at a bottom wall of the unit housing in the region where the air flowing space is located so that sludge is discharged.

A communication hole communicating with the permeating water collecting space may be formed at the bundle placing portion, and a pipe placing protrusion may be formed on an outer wall of the communication hole so that a square pipe is placed thereon.

The module supporting unit may include an upper unit and a lower unit disposed at both sides of the hollow fiber membrane bundle to support the hollow fiber membrane bundle at both sides thereof, the upper unit and the lower unit having different shapes.

According to the present disclosure, it is possible to delay or intermittently maintain air cleaning time using an efficient structure for generating coarse bubbles, thereby ensuring improved energy saving and filtration treatment efficiency in comparison to the conventional art.

DETAILED DESCRIPTION

Figure 1:
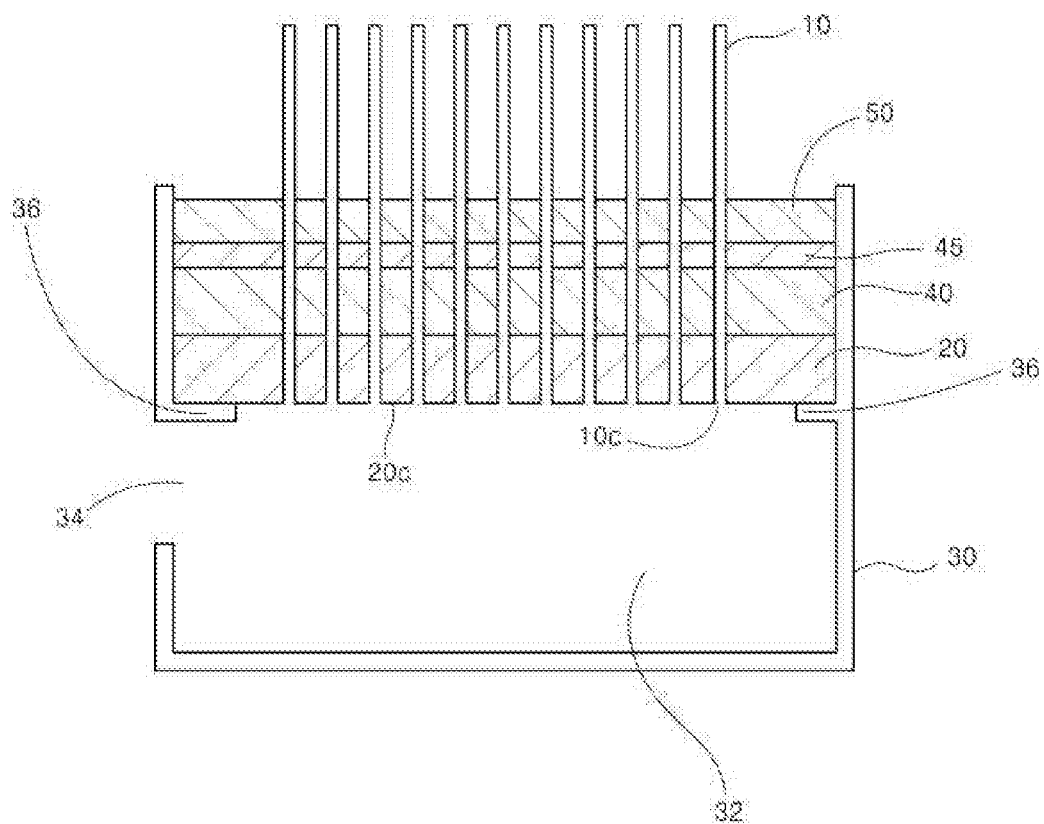
FIG. 1 is a diagram showing a conventional immersed hollow fiber membrane module.

Hereinafter, embodiments of the present disclosure will be described in detail with reference to the accompanying drawings so that those skilled in the art may easily implement the present disclosure. However, since the description of the present disclosure is only an embodiment for structural or functional explanation, the scope of the present disclosure should not be construed as limited by the embodiments described in the specification. That is, the embodiments may be variously modified and may have various forms, and thus the scope of the present disclosure should be understood to include equivalents capable of realizing the technical idea. In addition, the purpose or effect presented in the present disclosure does not mean that a specific embodiment should include all or only such effects, and therefore the scope of the present disclosure should not be understood as being limited thereto.

The meaning of the terms described in the present disclosure should be understood as follows.

In case it is mentioned that any component is "connected" to another component, the component may be connected directly to another component, but it should be understood that any other component can be further interposed between them. Meanwhile, when a component is mentioned to be "directly connected" to another component, it should be understood that there is no other component therebetween. Meanwhile, other expressions describing the relationship between components, such as "between" and "immediately between" or "adjacent to" and "directly adjacent to", should be interpreted in the same way.

The singular expressions should be understood to include the plural forms as well, unless the context clearly indicates otherwise. The term such as "include" and "have" is just to specify the presence of features, integers, steps, operations, elements, parts or components thereof, but does not preclude the presence or addition of one or more other features, integers, steps, operations, elements, parts or components thereof.

All terms used herein have the same meaning as commonly understood by those skilled in the art, unless otherwise defined. The terms defined in the commonly used dictionaries should be construed to be consistent with the meaning of the context in the related art and should not be construed as having ideal or overly formal meanings unless expressly defined in the present disclosure.

Embodiments of the present disclosure will now be described in detail with reference to the drawings. In the description of the embodiments, like reference numerals are given to like components.

Figure 2:
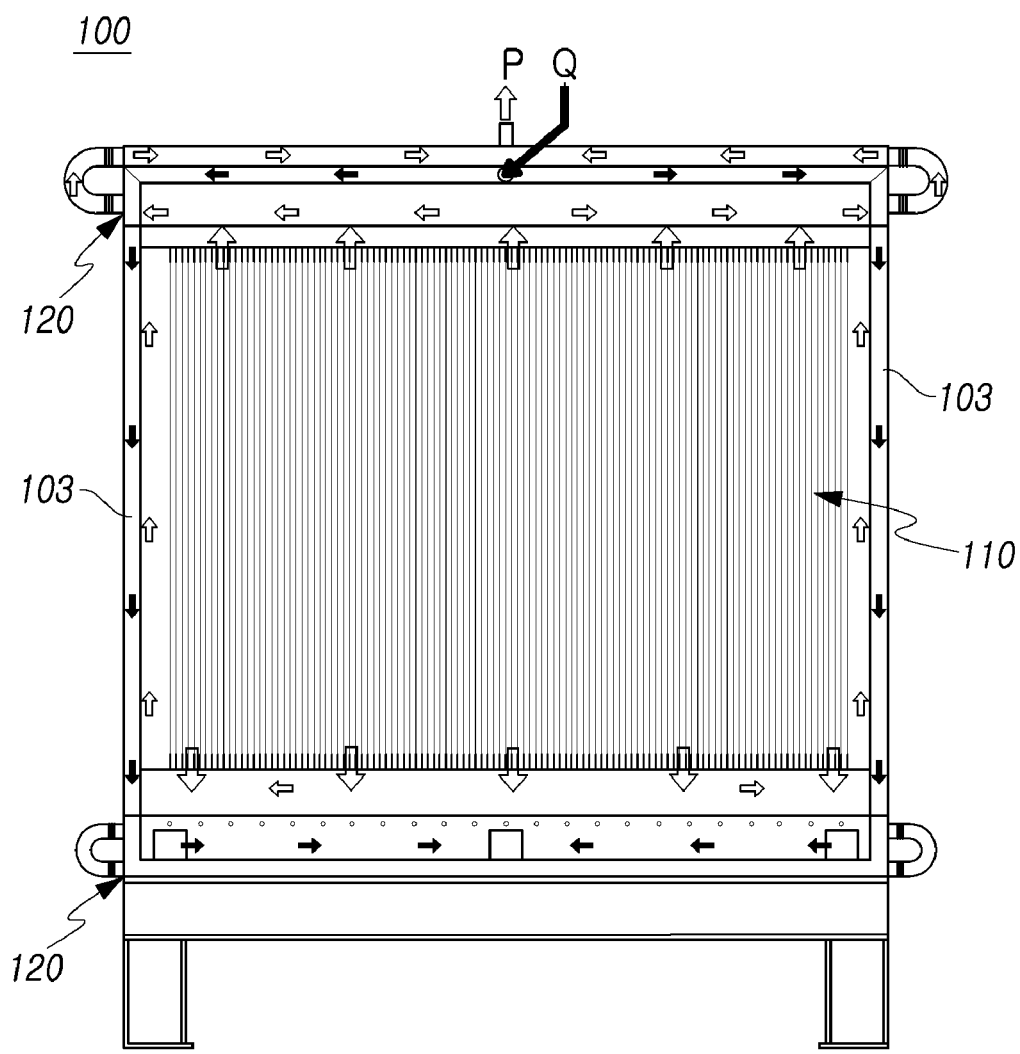
FIG. 2 is a diagram showing an integral immersed hollow fiber membrane module equipment for air scouring according to an embodiment of the present disclosure, which is coupled to a frame.
Figure 3:
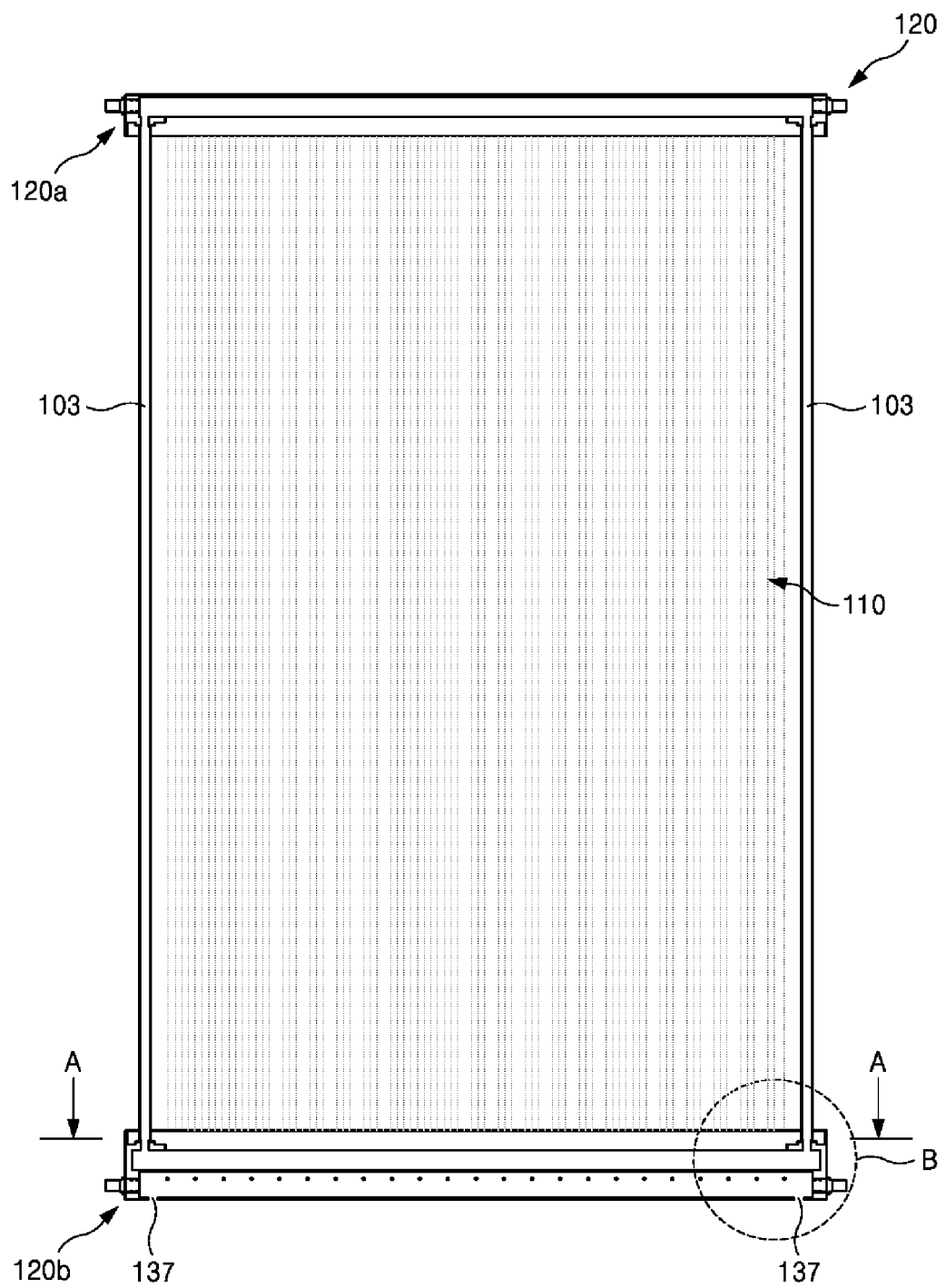
FIG. 3 is an enlarged view showing an essential part of FIG. 2.
Figure 4:
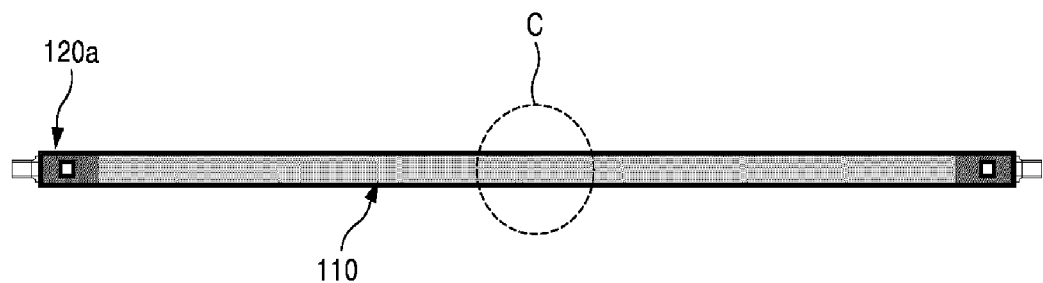
FIG. 4 is a partial sectioned view, taken along the line A-A of FIG. 3.
Figure 5:
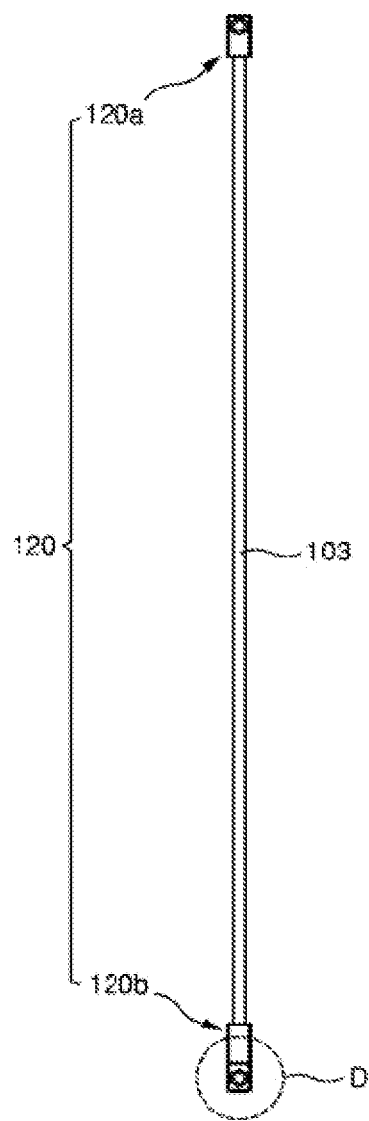
FIG. 5 is a side view of FIG. 3.
Figure 6:
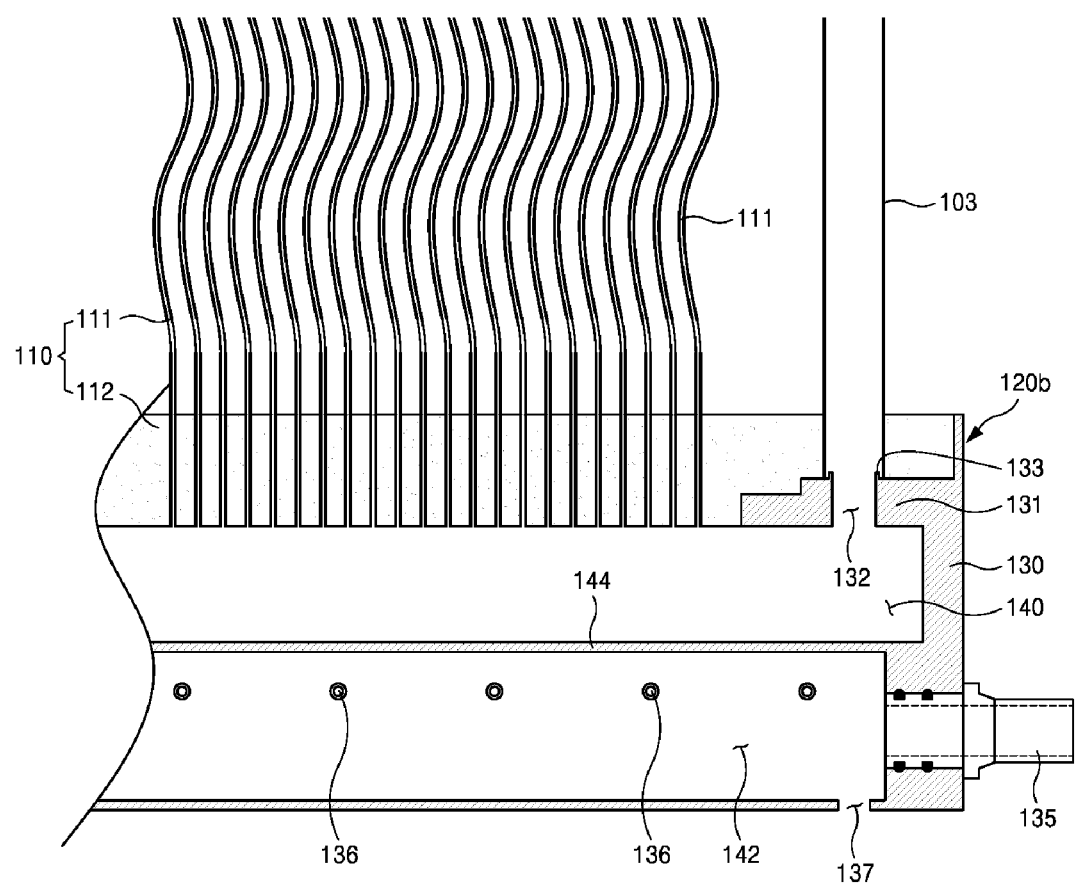
FIG. 6 is an enlarged sectioned view showing a B region of FIG. 3.
Figure 7:
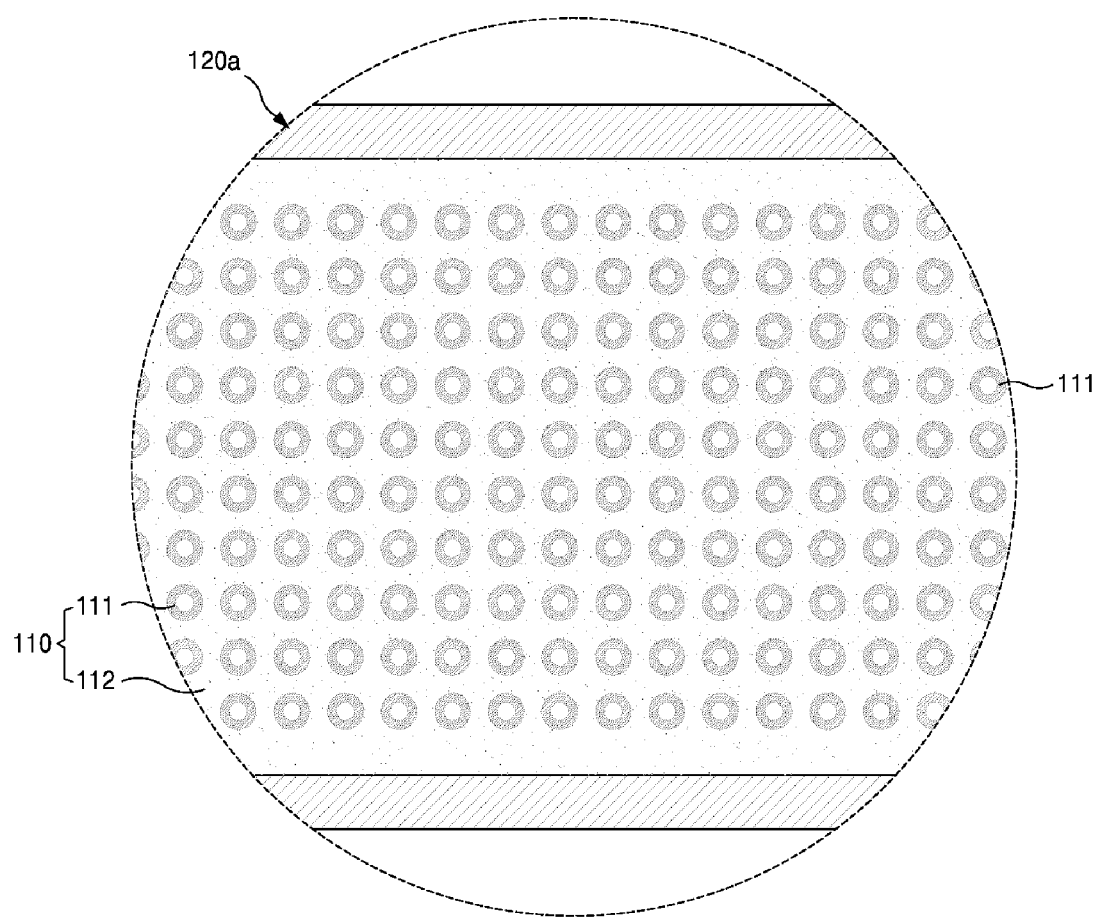
FIG. 7 is an enlarged view showing a C region of FIG. 4.
Figure 8:
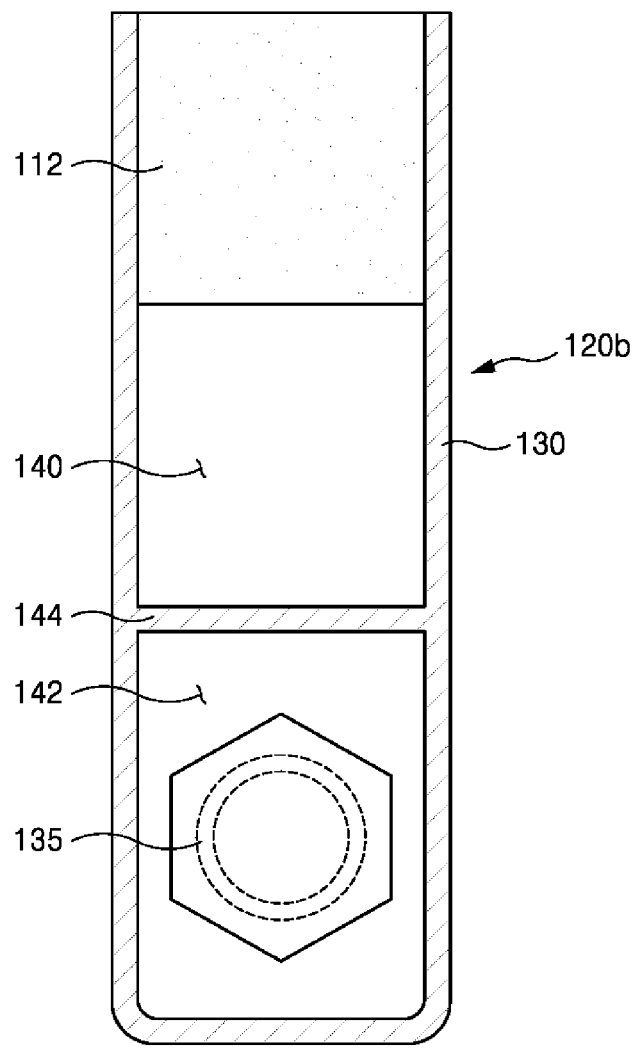
FIG. 8 is an enlarged sectioned view showing an end portion of a D region of FIG. 5.
Figure 9:
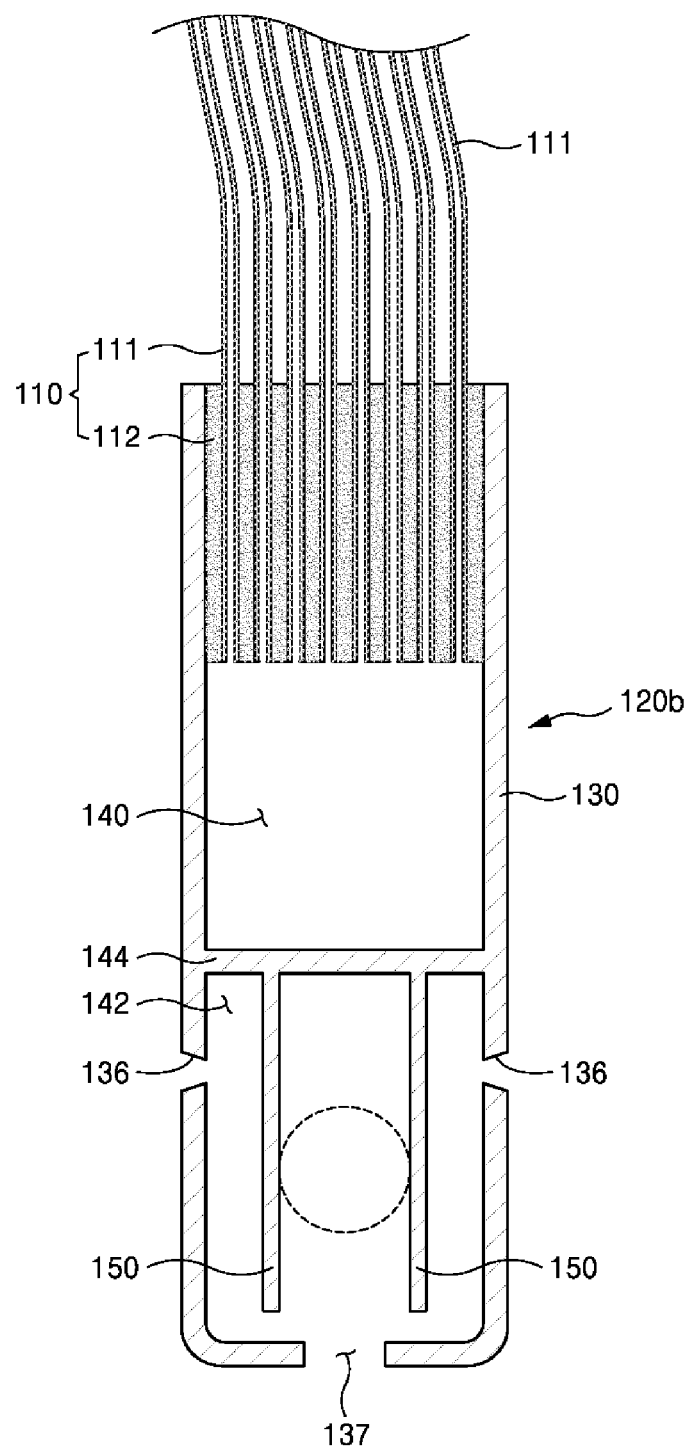
FIG. 9 is an enlarged sectioned view showing a hollow fiber membrane bundle in the D region of FIG. 5.

FIG. 2 is a diagram showing an immersed hollow fiber membrane module according to an embodiment of the present disclosure, FIG. 3 is an enlarged view showing an essential part of FIG. 2, FIG. 4 is a partial sectioned view, taken along the line A-A of FIG. 3, FIG. 5 is a side view of FIG. 3, FIG. 6 is an enlarged sectioned view showing a B region of FIG. 3, FIG. 7 is an enlarged view showing a C region of FIG. 4, FIG. 8 is an enlarged sectioned view showing an end portion of a D region of FIG. 5, and FIG. 9 is an enlarged sectioned view showing a hollow fiber membrane bundle in the D region of FIG. 5.

Referring to the figures, the immersed hollow fiber membrane module 100 according to this embodiment may delay or intermittently maintain air discharge time using an efficient structure, thereby ensuring improved membrane contamination reduction and energy saving in comparison to the conventional art.

The integrated immersed hollow fiber membrane module equipment 100 for air scouring according to this embodiment, which may provide the above effects, includes a hollow fiber membrane bundle 110 and a module supporting unit 120 for supporting the hollow fiber membrane bundle 110, and an air cleaning time delaying portion 150 for delaying or intermittently maintaining an air cleaning time for air introduced therein and discharged out is applied thereto. For reference, it should be noted that, in FIG. 2, the integrated immersed hollow fiber membrane module equipment 100 for air scouring according to this embodiment is coupled to a frame for the sake of explanation.

Referring to FIG. 2, a permeating water may be sucked in a P direction through the immersed hollow fiber membrane module 100 according to this embodiment, and air may be supplied in a Q direction. Here, it is also possible that the supply of air in the Q direction is omitted and air is directly supplied by attaching a solenoid valve to an air injection portion 135 of FIG. 6. Thus, the scope of the present disclosure is not limited to the shape of the figures.

First, the hollow fiber membrane bundle 110 will be described. The hollow fiber membrane bundle 110 is an aggregate formed by fixing a plurality of hollow fiber membranes 111 by a potting agent 112.

As well known in the art, the hollow fiber membrane 111 is a thin fiber with an empty central space, and the potting agent 112 serves to fix ends of the plurality of hollow fiber membranes 111. After the plurality of hollow fiber membranes 111 are immersed in the liquid or gel type potting agent 112, when the potting agent 112 is hardened, a portion of the hardened the potting agent 112 is cut to manufacture the hollow fiber membrane bundle 110. Even if the potting agent 112 is fixed to the end of the hollow fiber membrane 111, the inside of the hollow fiber membrane 111 may maintain the empty space.

Meanwhile, the module supporting unit 120 is provided at one side of the hollow fiber membrane bundle 110 to support the hollow fiber membrane bundle 110 and simultaneously serve as a path through which fluid flows.

In this embodiment, the module supporting unit 120 is disposed at both sides of the hollow fiber membrane bundle 110 to support the hollow fiber membrane bundle 110 at both sides thereof.

The module supporting unit 120 may include an upper unit 120a and a lower unit 120b. The upper unit 120a and the lower unit 120b serve to support the hollow fiber membrane bundle 110, but they may have different shapes.

Referring to FIGS. 6 to 9 mainly, the module supporting unit 120 may include a unit housing 130, a permeating water collecting space 140, an air flowing space 142, and an air cleaning time delaying portion 150.

The unit housing 130 forms an appearance of the module supporting unit 120. Since the unit housing 130 is immersed in water, the unit housing 130 may be made of a plastic material with excellent corrosion resistance and high rigidity.

The bundle placing portion 131 is provided at an inner wall of the unit housing 130. The bundle placing portion 131 gives a region on which the end of the hollow fiber membrane bundle 110 is placed.

A communication hole 132 communicating with the permeating water collecting space 140 is formed in the bundle placing portion 131. In addition, a pipe placing protrusion 133 on which a square pipe 103 is placed is formed in an outer wall of the communication hole 132.

As the bundle placing portion 131 is applied in the unit housing 130, the hollow fiber membrane bundle 110 may be easily placed and coupled in place. In addition, as the pipe placing protrusion 133 is formed on the bundle placing portion 131, the square pipe 103 may be installed easily.

The permeating water collecting space 140 is a space where a permeating water is collected and is formed in the unit space 130 to communicate with the hollow fiber membrane bundle 110. In addition, the air flowing space 142 is formed in the unit housing 130 to be adjacent to the permeating water collecting space 140 to form a place where the air flows.

A barrier 144 is provided between the permeating water collecting space 140 and the air flowing space 142 in the unit housing 130 to compart the permeating water collecting space 140 and the air flowing space 142.

An air injection portion 135 for supplying air to the air flowing space 142 of the unit housing 130 is formed at one side of the unit housing 130. As mentioned above, air may be directly supplied by using the air injection portion 135.

In the region where the air flowing space 142 is located, a plurality of air outlet holes 136 are formed at a sidewall of the unit housing 130.

The air outlet hole 136 is provided in the form of a hole, and the plurality of air outlet holes 136 are spaced apart from each other at the sidewall of the unit housing 130. In this embodiment, the air outlet hole 136 is formed through the sidewall of the unit housing 130 with a width gradually increasing in an outward direction. As the air outlet hole 136 is shaped to have a width gradually increasing in the outward direction, the air outlet hole 136 may be not easily plugged by sludge. In other words, the air may be discharged smoothly.

In the region where the air flowing space 142 is located, a sludge outlet hole 137 is provided at a bottom wall of the unit housing 130 so that sludge is discharged therethrough. As the sludge outlet hole 137 is formed, it is possible to effectively prevent that sludge is deposited in the air flowing space 142 to reduce an air flowing space.

Meanwhile, the air cleaning time delaying portion 150 is provided to the unit housing 130 and serves to delay or intermittently maintain an air cleaning time for air that is introduced into the air flowing space 142 and discharged out. That is, if air is supplied, the water in the space is slowly discharged to form an air space. Here, it is possible to delay the air discharging time by controlling the time during which the air is filled in the air space.

In this embodiment, the air cleaning time delaying portion 150 is applied to the air baffle walls that are connected to intersect the barrier 144 and spaced apart from each other. However, the air cleaning time delaying portion 150 may also be applied in other types.

According to this embodiment having the structure and operation as described above, it is possible to delay the air discharging time with an efficient structure, thereby improving the filtration treatment efficiency in comparison to the conventional art.

Figure 10:
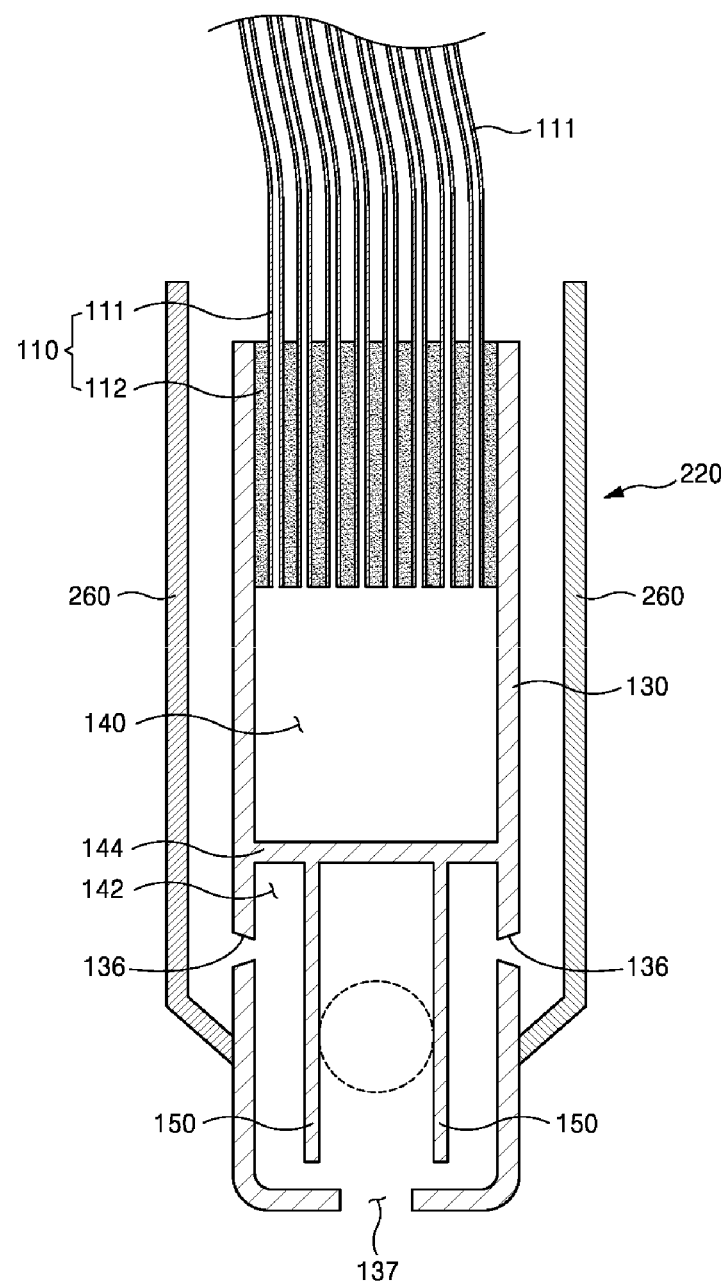
FIG. 10 is an enlarged sectioned view showing a hollow fiber membrane bundle, employed at an immersed hollow fiber membrane module according to another embodiment of the present disclosure.

FIG. 10 is an enlarged sectioned view showing a hollow fiber membrane bundle, employed at an immersed hollow fiber membrane module according to another embodiment of the present disclosure.

Referring to FIG. 10, in this embodiment, a module supporting unit 220 may also include a unit housing 130, a permeating water collecting space 140, an air flowing space 142, and an air cleaning time delaying portion 150.

In addition, in the region where the air flowing space 142 is located, a plurality of air outlet holes 136 are formed at the sidewall of the unit housing 130.

Meanwhile, in this structure, the air guide 260 is coupled to the outer wall of the unit housing 130. The air guide 260 is connected to the unit housing 130 in the region where the air outlet hole 136 is located, and serves to guide the air flow to be supplied to the hollow fiber membrane bundle 110 by intermittently adjusting the flow of air discharged through the air outlet hole 136. Thus, the energy saving and the filtration treatment efficiency may be further improved.

If this embodiment is applied, it is also possible to delay or intermittently maintain air discharge time using an efficient structure, thereby ensuring improved membrane contamination reduction and energy saving in comparison to the conventional art.

As such, the present disclosure is not limited to the embodiments, and various modifications and changes may be made without departing from the scope of the present disclosure, as obvious to those skilled in the art. Therefore, such modifications or changes shall fall within the scope of the appended claims.

What is claimed is:

1. An immersed hollow fiber membrane module, comprising:
   a hollow fiber membrane bundle formed by fixing a plurality of hollow fiber membranes by a potting agent; and
   a module supporting unit provided at one side of the hollow fiber membrane bundle to support the hollow fiber membrane bundle, the module supporting unit having an air cleaning time delaying portion configured to delay or intermittently maintain an air cleaning time for air introduced therein and discharged out and an air guide connected to a unit housing forming an appearance thereof in a region where the air is discharged and guiding a flow of the discharged air to be supplied to the hollow fiber membrane bundle, the module supporting unit comprising:
 a bundle placing portion provided to an inner wall of the unit housing so that an end of the hollow fiber membrane bundle is placed thereon;
 a permeating water collecting space formed in the unit housing to communicate with the hollow fiber membrane bundle so that a permeating what is collected therein;
 an air flowing space formed in the unit housing to be adjacent to the permeating water collecting space so that air flows therein; and
 a sludge outlet hole formed at a bottom wall of the unit housing in the region where the air flowing space is located so that sludge is discharged,
 wherein the air cleaning time delaying portion is provided in the air flowing space.

2. The immersed hollow fiber membrane module according to claim 1, wherein the module supporting unit further includes a barrier provided in the unit housing to compart the permeating water collecting space and the air flowing space; and
 the air cleaning time delaying portion is air baffle walls connected to intersect the barrier and spaced apart from each other.

3. The immersed hollow fiber membrane module according to claim 1, wherein the module supporting unit further includes:
 an air injection portion connected to the unit housing to supply air to the air flowing space of the unit housing; and
 a plurality of air outlet holes provided at a sidewall of the unit housing in a region where the air flowing space is located,
 wherein the air outlet hole is formed through the sidewall of the unit housing with a width gradually increasing in an outward direction.

4. The immersed hollow fiber membrane module according to claim 1, wherein a communication hole communicating with the permeating water collecting space is formed at the bundle placing portion, and a pipe placing protrusion is formed on an outer wall of the communication hole so that a square pipe is placed thereon.

5. The immersed hollow fiber membrane module according to claim 1, wherein the module supporting unit includes an upper unit and a lower unit disposed at both sides of the hollow fiber membrane bundle to support the hollow fiber membrane bundle at both sides thereof, the upper unit and the lower unit having different shapes.

6. An immersed hollow fiber membrane module, comprising:
 a hollow fiber membrane bundle formed by fixing a plurality of hollow fiber membranes by a potting agent;
 a module supporting unit provided at one side of the hollow fiber membrane bundle to support the hollow fiber membrane bundle and having an air cleaning time delaying portion configured to delay or intermittently maintain an air cleaning time for air introduced therein and discharged out, the module supporting unit comprising:
 a unit housing forming an appearance thereof;
 a permeating water collecting space formed in the unit housing to communicate with the hollow fiber membrane bundle so that a permeating wat is collected therein;
 an air flowing space formed in the unit housing to be adjacent to the permeating water collecting space so that the air cleaning time delaying portion is provided therein; and
 a barrier provided in the unit housing to compart the permeating water collecting space and the air flowing space,
 wherein the air cleaning time delaying portion is air baffle walls spaced apart from each other, the air baffle walls extending from the barrier and having a lower end spaced apart from a bottom surface of the air flowing space;
 an air guide connected to a unit housing forming an appearance thereof in a region where the air is discharged and guiding a flow of the discharged air to be supplied to the hollow fiber membrane bundle; and
 a sludge outlet hole formed at a bottom wall of the unit housing in the region where the air flowing space is located so that sludge is discharged.

7. The immersed hollow fiber membrane module according to claim 6, wherein the module supporting unit further includes an air injection portion connected to the unit housing to supply air to the air flowing space of the unit housing.

8. The immersed hollow fiber membrane module according to claim 6, wherein the module supporting unit further includes a plurality of air outlet holes provided at a sidewall of the unit housing in a region where the air flowing space is located.

9. The immersed hollow fiber membrane module according to claim 8, wherein the air outlet hole is formed through the sidewall of the unit housing with a width gradually increasing in an outward direction so that the air outlet hole is not easily plugged by sludge.

* * * * *